(12) United States Patent
Nakajima et al.

(10) Patent No.: US 7,154,203 B2
(45) Date of Patent: Dec. 26, 2006

(54) MOTOR AND BRUSH DEVICE

(75) Inventors: Fumio Nakajima, Yokohama (JP); Toshihiro Negishi, Yokohama (JP); Jun. ichi Imai, Yokohama (JP)

(73) Assignee: Jidosha Denki Kogyo Kabushiki Kaisha, Kanagawa (JP)

( * ) Notice: Subject to any disclaimer, the term of this patent is extended or adjusted under 35 U.S.C. 154(b) by 0 days.

(21) Appl. No.: 11/034,944

(22) Filed: Jan. 14, 2005

(65) Prior Publication Data

US 2005/0121995 A1 Jun. 9, 2005

Related U.S. Application Data

(62) Division of application No. 10/125,585, filed on Apr. 19, 2002.

(30) Foreign Application Priority Data

Apr. 19, 2001 (JP) ............................. 2001-120555

(51) Int. Cl.
*H02K 7/10* (2006.01)
(52) U.S. Cl. ........................ 310/83; 310/248
(58) Field of Classification Search .................. 310/83, 310/239, 242, 248; H02K 13/00; H01R 39/18
See application file for complete search history.

(56) References Cited

U.S. PATENT DOCUMENTS 3,590,297 A  6/1971 Smith et al.
4,572,979 A  2/1986 Haar et al.
5,015,897 A  5/1991 Inagaki et al.
5,440,186 A  8/1995 Forsell et al.
6,201,326 B1  3/2001 Klappenhach et al.
6,452,297 B1  9/2002 Yamamoto et al.
6,515,399 B1  2/2003 Lauf et al.
6,664,700 B1 * 12/2003 Yamada et al. ............. 310/239
6,745,865 B1  6/2004 Hama et al.
6,756,711 B1 *  6/2004 Matsuyama et al. ...... 310/68 R
6,787,953 B1 *  9/2004 Torii ........................... 310/71

FOREIGN PATENT DOCUMENTS

JP       07-123649    * 12/1995
JP           37059    *  2/2000
JP      2002-084717   *  3/2002

* cited by examiner

*Primary Examiner*—Darren Schuberg
*Assistant Examiner*—Nguyen Hanh
(74) *Attorney, Agent, or Firm*—Arent Fox PLLC

(57) ABSTRACT

A motor and a brush device are provided which allow an easy assembly of brush holders. The brush holders have fixing portions and brush accommodating portions integrally formed therewith. The fixing portions are secured to the gear case, and the brush accommodating portions slidably hold brushes. The motor has a gear case which is integrally formed with a reduction mechanism accommodating portion to accommodate a reduction mechanism and with a brush holder mounting portion in which the brush holders can be installed in a direction of an axis of the output shaft.

12 Claims, 17 Drawing Sheets

MOTOR AND BRUSH DEVICE

This is a Divisional of U.S. patent application Ser. No. 10/125,585, which was filed on Apr. 19, 2002, and is entitled "MOTOR AND BRUSH DEVICE", the disclosure of which is hereby incorporated by reference herein in its entirety.

BACKGROUND OF THE INVENTION

Field of the Invention

The present invention relates to a motor and a brush device used in, for example, a sun roof drive unit in motor vehicles.

The motor and the brush device of this kind are known to have a construction in which a brush holder has its base end portion mounted to a holder base provided separately from a case and its front end portion attached with a brush. The brush is pressed against a commutator by the brush holder so that the brush is electrically connectable to the commutator.

In the motor and the brush device described above, however, since the brush holder is mounted to the holder base which is formed separately from the case, the assembly work cannot be performed easily.

It is an object of the present invention to provide a motor and a brush device which allow a very easy assembly of the brush holder.

SUMMARY OF THE INVENTION

According to a first aspect, the present invention provides a small motor which comprises: a motor case accommodating an armature, the armature being adapted to rotate when energized; a rotatable reduction mechanism receiving the rotation of the armature; an output shaft coupled to the reduction mechanism for rotation; a gear case connected to the motor case to rotatably support the output shaft; a brush electrically connectable to a commutator provided to the armature; a brush spring for pressing the brush against the commutator; and a brush holder installed in the gear case and slidably holding the brush; wherein the brush holder has a fixing portion and a brush accommodating portion integrally formed therewith, the fixing portion being secured to the gear case, the brush accommodating portion slidably holding the brush; wherein the gear case is integrally formed with a reduction mechanism accommodating portion for accommodating the reduction mechanism and with a brush holder mounting portion in which the brush holder can be installed in a direction of an axis of the output shaft.

According to a second aspect, the present invention provides a motor with the construction of the first aspect wherein the brush has a sliding portion and a tapered surface, the sliding portion being formed at almost a central part of the brush and protruding from a brush body to come into sliding contact with the commutator, the tapered surface adjoining the sliding portion and being arranged in a tapered configuration and adapted to contact the commutator and thereby increase an area of the brush in contact with the commutator as the wear of the sliding portion proceeds.

According to a third aspect, the present invention provides a motor with the construction of the first or second aspect wherein a pair of the brush and the brush accommodating portion has a temporary locking means which, when inserting the commutator, temporarily locks the brush at a predetermined position so that the commutator can be inserted and which, after the commutator has been inserted, unlocks the brush allowing the brush to come into electrical contact with the commutator.

According to a fourth aspect, the present invention provides a motor with the construction of the third aspect wherein the temporary locking means comprises a locking portion formed in the brush and a brush locking tongue piece formed in a part of the brush accommodating portion, the brush locking tongue piece being adapted to engage the locking portion of the brush when the commutator is inserted and, after the commutator has been inserted, to disengage from the locking portion.

According to a fifth aspect, the present invention provides a brush device which comprises: a brush electrically connectable to a commutator provided to an armature of a motor; and a brush holder secured to a case of the motor to hold the brush in such a way that the brush can be brought into sliding contact with the commutator; wherein the brush is formed with a sliding portion and a tapered surface, the sliding portion protruding from a brush body to come into sliding contact with the commutator, the tapered surface adjoining the sliding portion and being arranged in a tapered configuration and adapted to contact the commutator and thereby increase an area of the brush in contact with the commutator as the wear of the sliding portion proceeds.

According to a sixth aspect, the present invention provides a brush device with the construction of the fifth aspect wherein the tapered surface of the brush comprises first and second tapered surfaces arranged one on each side of the sliding portion formed at almost a center of the brush with respect to a direction of rotation of the commutator.

According to a seventh aspect, the present invention provides a brush device with the construction of the fifth or sixth aspect wherein the sliding portion of the brush has a curved surface.

According to an eighth aspect, the present invention provides a brush device with the construction of the fifth, sixth or seventh aspect wherein a pair of the brush and the brush accommodating portion has a temporary locking means which, when inserting the commutator, temporarily locks the brush at a predetermined position so that the commutator can be inserted and which, after the commutator has been inserted, unlocks the brush allowing the brush to come into electrical contact with the commutator.

According to a ninth aspect, the present invention provides a brush device with the construction of the eighth aspect wherein the temporary locking means comprises a locking portion formed in the brush and a brush locking tongue piece formed in a part of the brush accommodating portion, the brush locking tongue piece being adapted to engage the locking portion of the brush when the commutator is inserted and, after the commutator has been inserted, to disengage from the locking portion.

In the motor and the brush device according to this invention, the brush holder having a brush accommodating portion for slidably holding the brush is installed in a brush holder mounting portion of the gear case in a direction of an axis of the output shaft to securely fix the fixing portion of the brush holder to the gear case. Therefore, the brush holder does not require the holder base and can be mounted directly to the gear case.

DETAILED DESCRIPTION OF PREFERRED EMBODIMENTS

Figure 1:
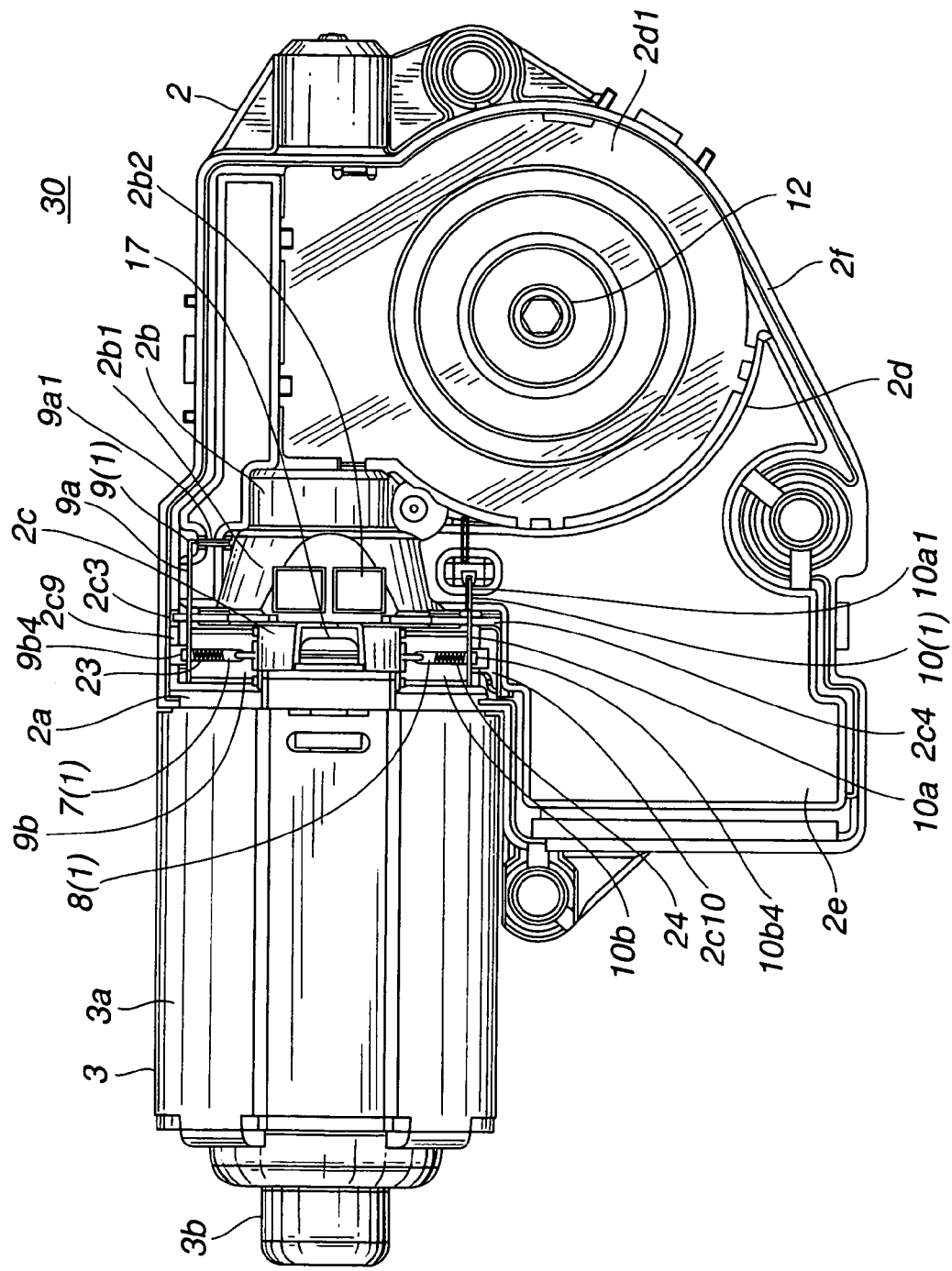
FIG. 1 is a plan view showing an inner construction of a gear case of a motor in one embodiment of the motor and brush device according to the present invention.
Figure 2:
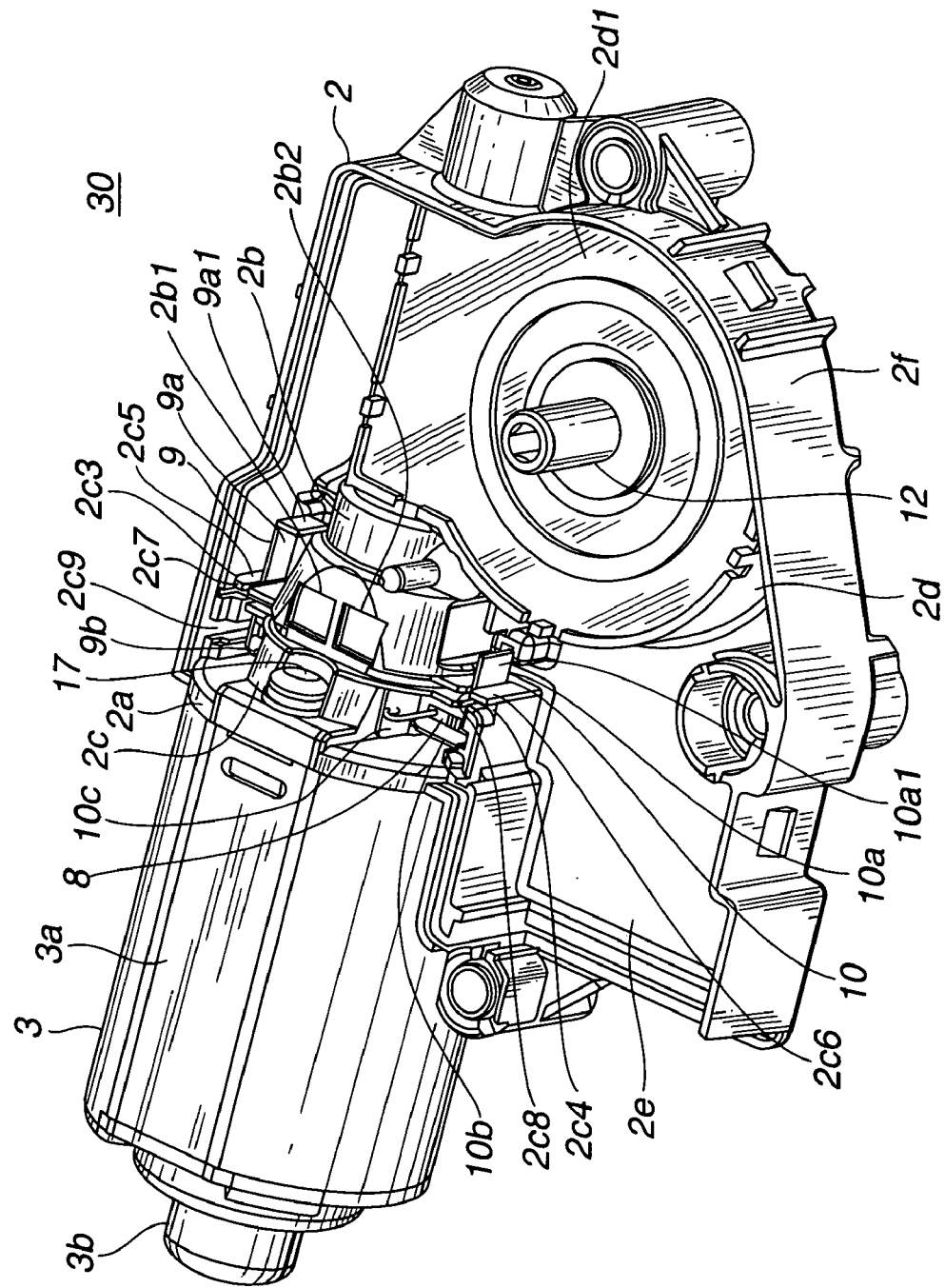
FIG. 2 is an external perspective view of the motor of FIG. 1.

FIG. 1 through FIG. 17 illustrate one embodiment of the motor and brush device according to the present invention.

In the motor and brush device of this invention, a motor 30 comprises mainly a gear case 2, a motor case 3, first and second magnets 4, 5, an armature 6, a wheel gear 11, an output shaft 12, and a brush device 1. The brush device 1 includes first and second brushes 7, 8 and first and second brush holders 9, 10. The armature 6 includes an armature shaft 13, an armature core 14, a commutator 15 and an armature coil 16.

The gear case 2 has a flange portion $2a$, an armature shaft accommodating portion $2b$, a brush holder mounting portion $2c$, a wheel gear accommodating portion $2d$, a connector accommodating portion $2e$, and a reduction mechanism accommodating portion $2f$, all formed integral as one piece. The flange portion $2a$ is secured to an open end of the motor case 3 with screws 17.

Figure 3:
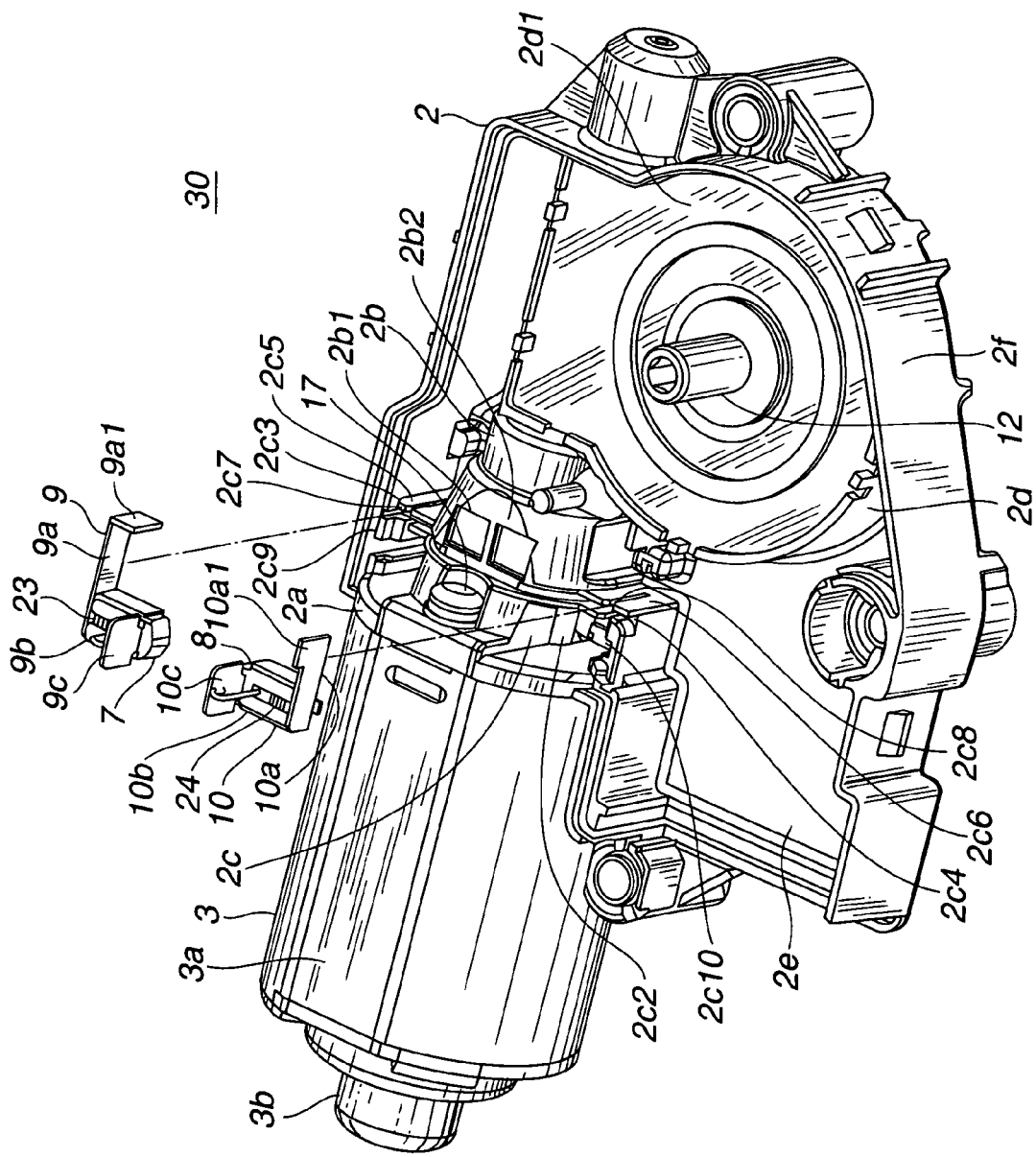
FIG. 3 is an external perspective view showing a mounting position of the brush device in the motor of FIG. 1.
Figure 4:
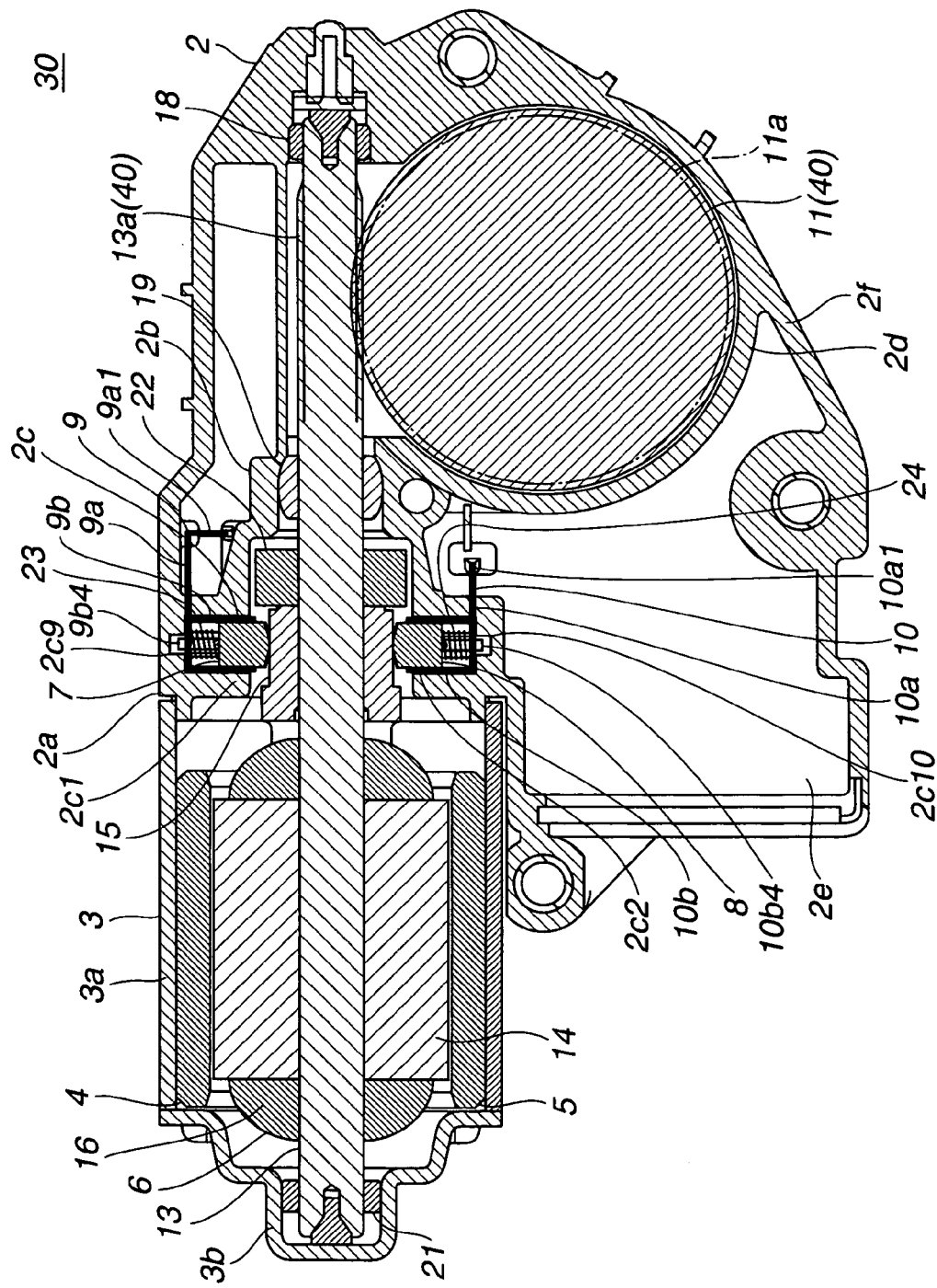
FIG. 4 is a transverse cross section of the motor of FIG. 1.
Figure 5:
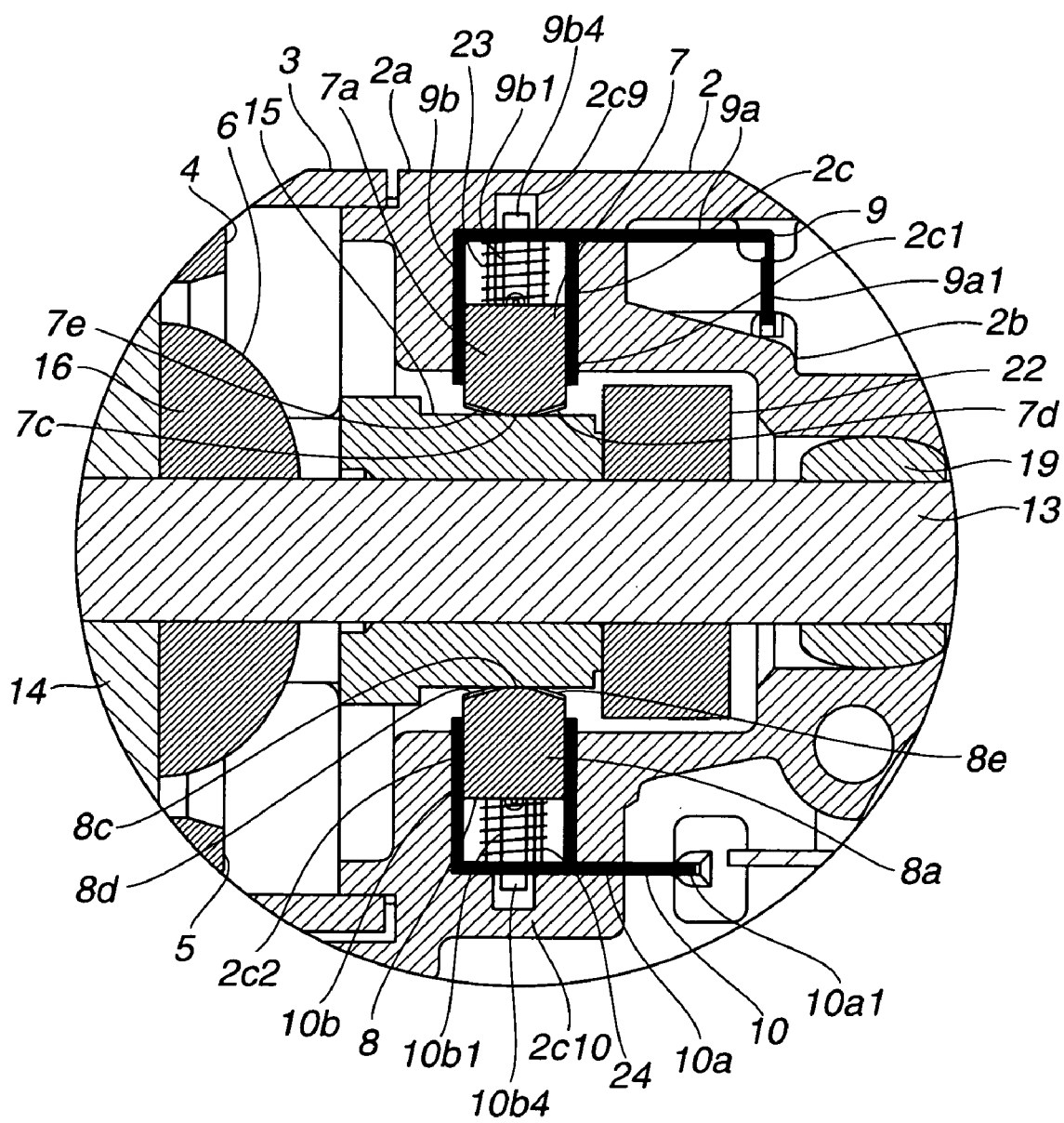
FIG. 5 is an enlarged view of the brush device and its associated parts in the motor of FIG. 4.

The armature shaft accommodating portion $2b$ is formed cylindrical, extending from a central part of the flange portion $2a$ toward the end of the gear case 2. As shown in FIG. 4, the armature shaft 13 of the armature 6 is inserted into the armature shaft accommodating portion $2b$. In the armature shaft accommodating portion $2b$, a first bearing 18 is arranged in the end portion of the gear case 2 and a second bearing 19 is arranged on the motor case side. The armature shaft accommodating portion $2b$ is formed with first and second rectangular magnetic force linking holes $2b1$, $2b2$ at positions corresponding to a sensor magnet 22 mounted on the armature shaft 13. The brush holder mounting portion $2c$ is arranged on the flange portion $2a$ side of the armature shaft accommodating portion $2b$. The brush holder mounting portion $2c$ is formed with a pair of first and second brush holder insertion holes $2c1$, $2c2$ through which the first and second brush holders 9, 10 are inserted. The first and second brush holder insertion holes $2c1$, $2c2$ are formed rectangular and extend through the armature shaft accommodating portion $2b$. The brush holder mounting portion $2c$ is formed with a pair of first and second fixing portions $2c3$, $2c4$ to which first and second fixing pieces $9a$, $10a$ formed on the first and second brush holders 9, 10 are secured. The first and second fixing portions $2c3$, $2c4$ comprise plate portions $2c5$, $2c6$ and notches $2c7$, $2c8$, as shown in FIG. 3. The brush holder mounting portion $2c$ is formed with first and second protrusion insertion grooves $2c9$, $2c10$ in which a pair of protrusions $50a$, $50b$, formed on a brush unlocking jig 50 and arranged at positions corresponding to the first and second brush holder insertion holes $2c1$, $2c2$, are inserted.

Figure 6:
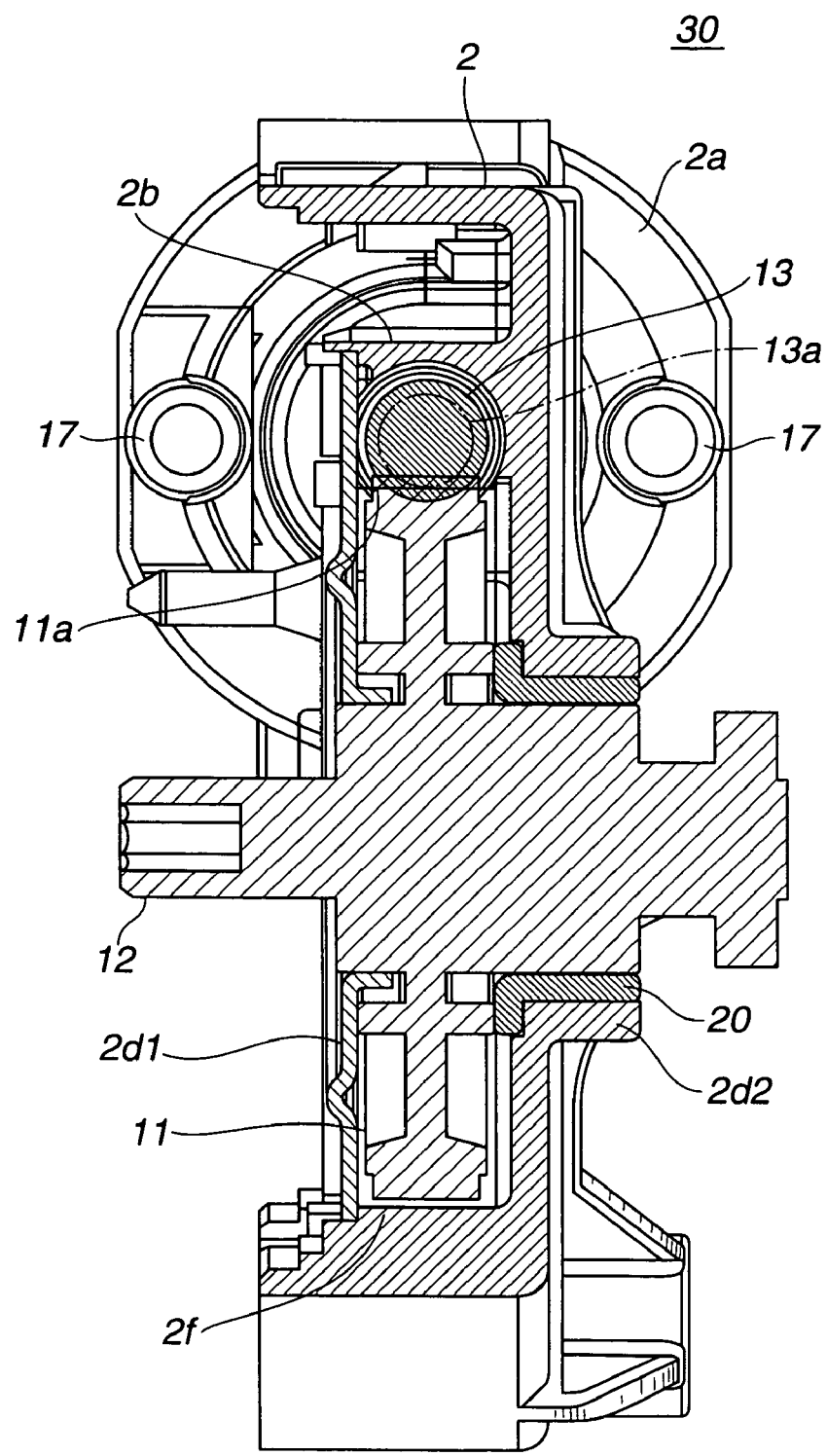
FIG. 6 is a vertical cross section of a wheel gear and its associated parts in the motor of FIG. 1.

The wheel gear accommodating portion $2d$ is formed cylindrical and communicates with the interior of the armature shaft accommodating portion $2b$. The wheel gear accommodating portion $2d$ accommodates the wheel gear 11 therein and is covered with a wheel gear cover $2d1$ from outside. Formed at a central part of the wheel gear accommodating portion $2d$ is a shaft support portion $2d2$ fixedly attached with a third bearing 20, as shown in FIG. 6. The third bearing 20 rotatably supports an output shaft 12 formed integral with a rotating central portion of the wheel gear 11. The output shaft 12 is coupled, for example, to a sun roof drive unit.

The connector accommodating portion $2e$ is located by the side of the wheel gear accommodating portion $2d$. A connector not shown is installed in the connector accommodating portion $2e$. Terminals of the connector are electrically connected to a control circuit on a printed circuit board not shown which is accommodated in the reduction mechanism accommodating portion $2f$. The reduction mechanism accommodating portion $2f$ that accommodates the printed circuit board is covered with a gear case cover not shown.

First and second magnets 4, 5 are mounted on the inner side of a motor case body $3a$ of the motor case 3. An end cover $3b$ is attached to an end of the motor case body $3a$ on the closed side. The end cover $3b$ has a fourth bearing 21. In the motor case 3, the armature 6 is rotatably supported by the first and second magnets 4, 5 in a noncontact manner and by the first, second and fourth bearings 18, 19, 21.

The armature 6 has an armature core 14, a commutator 15 and a sensor magnet 22, all secured to the armature shaft 13. The armature core 14 is wound with an armature coil 16 electrically connected to the commutator 15. The armature shaft 13 inserted in the armature shaft accommodating portion $2b$ of the gear case 2 has one part thereof near one end formed with a worm gear 13 that constitutes a reduction mechanism 40. The worm gear 13 is in mesh with a gear portion $11a$ of the wheel gear 11 that also makes up the reduction mechanism 40.

The first and second brush holders 9, 10 are integrally formed with first and second fixing pieces $9a$, $10a$, first and second brush accommodating portions $9b$, $10b$, and third and fourth fixing pieces $9c$, $10c$. The first and second fixing pieces 9a, 10a are shaped like plates. The first fixing piece 9a for the first brush holder 9, as shown in FIG. 10 to FIG. 13, is longer than the second fixing piece 10a for the second brush holder 10 shown in FIG. 14 to FIG. 17. The first fixing piece 9a is fitted into a notch 2c7 formed in the first fixing portion 2c3 of the brush holder mounting portion 2c in the gear case 2 to fix the first brush holder 9 to the gear case 2. The second fixing piece 10a is fitted into a notch 2c8 formed in the second fixing portion 2c4 of the brush holder mounting portion 2c in the gear case 2 to fix the second brush holder 10 to the gear case 2. The first fixing piece 9a has an L-shaped terminal portion 9a1 at its free end, and the second fixing piece 10a has a linearly extending terminal portion 10a1 at its free end. The terminal portions 9a1, 10a1 are electrically connected to a control circuit on the printed circuit board. The third and fourth fixing pieces 9c, 10c are fitted into first and second brush holder insertion holes 2c1, 2c2 of the gear case 2.

First and second brushes 7, 8 are installed in the first and second brush accommodating portions 9b, 10b through first and second brush springs 23, 24. The first and second brushes 7, 8 accommodated in the first and second brush accommodating portions 9b, 10b are supported movable in a radial direction of the commutator 15, i.e., in a direction of cylinder axes of the first and second brush accommodating portions 9b, 10b. The first and second brush accommodating portions 9b, 10b have their bottoms formed with slits 9b2, 9b2 at a predetermined interval and slits 10b2, 10b2 at a predetermined interval. These slits 9b2, 9b2 and slits 10b2, 10b2 form first and second brush locking tongue pieces 9b1, 10b1. The first and second brush locking tongue pieces 9b1, 10b1 have elasticity at their free end or front end because of the slits 9b2, 9b2 and slits 10b2, 10b2. First and second projections 9b3, 10b3 are formed on the upper surfaces of the first and second brush locking tongue pieces 9b1, 10b1.

Figure 7:
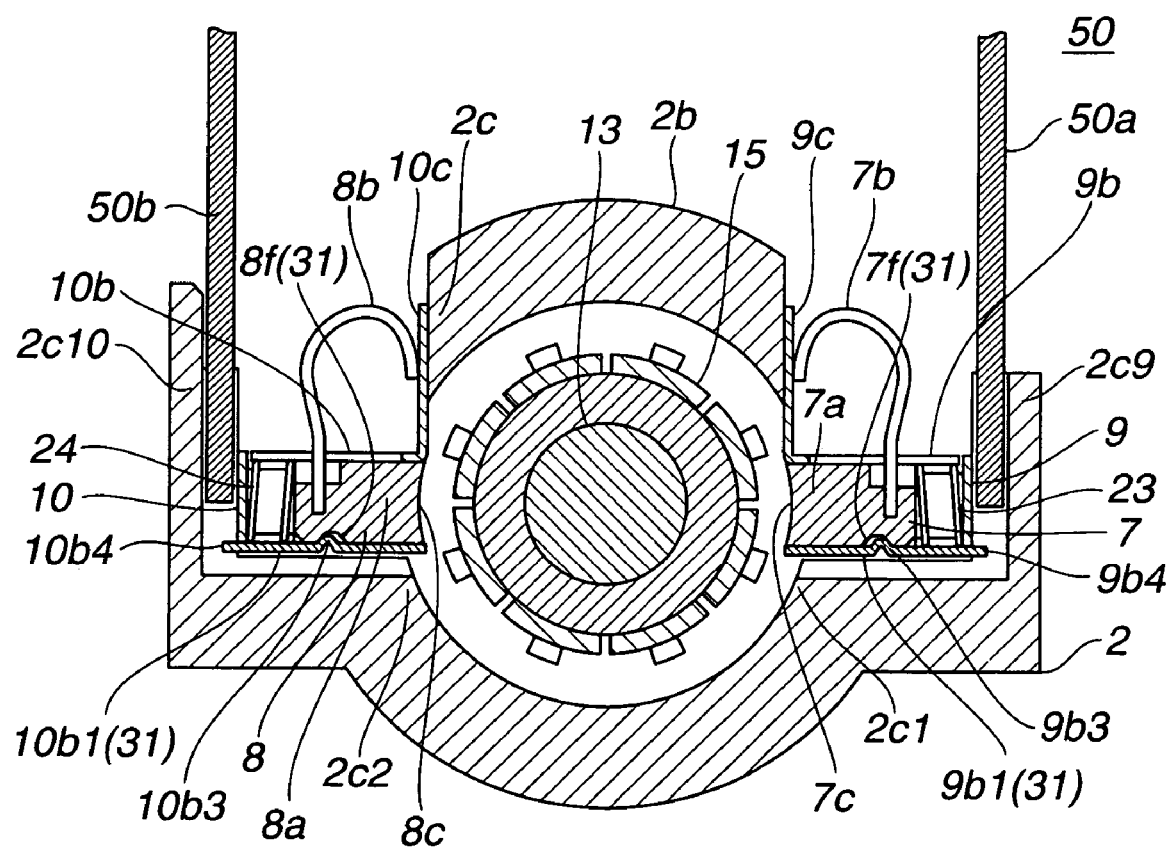
FIG. 7 is a vertical cross section showing positions of the brushes when a commutator is installed in the motor of FIG. 1.
Figure 8:
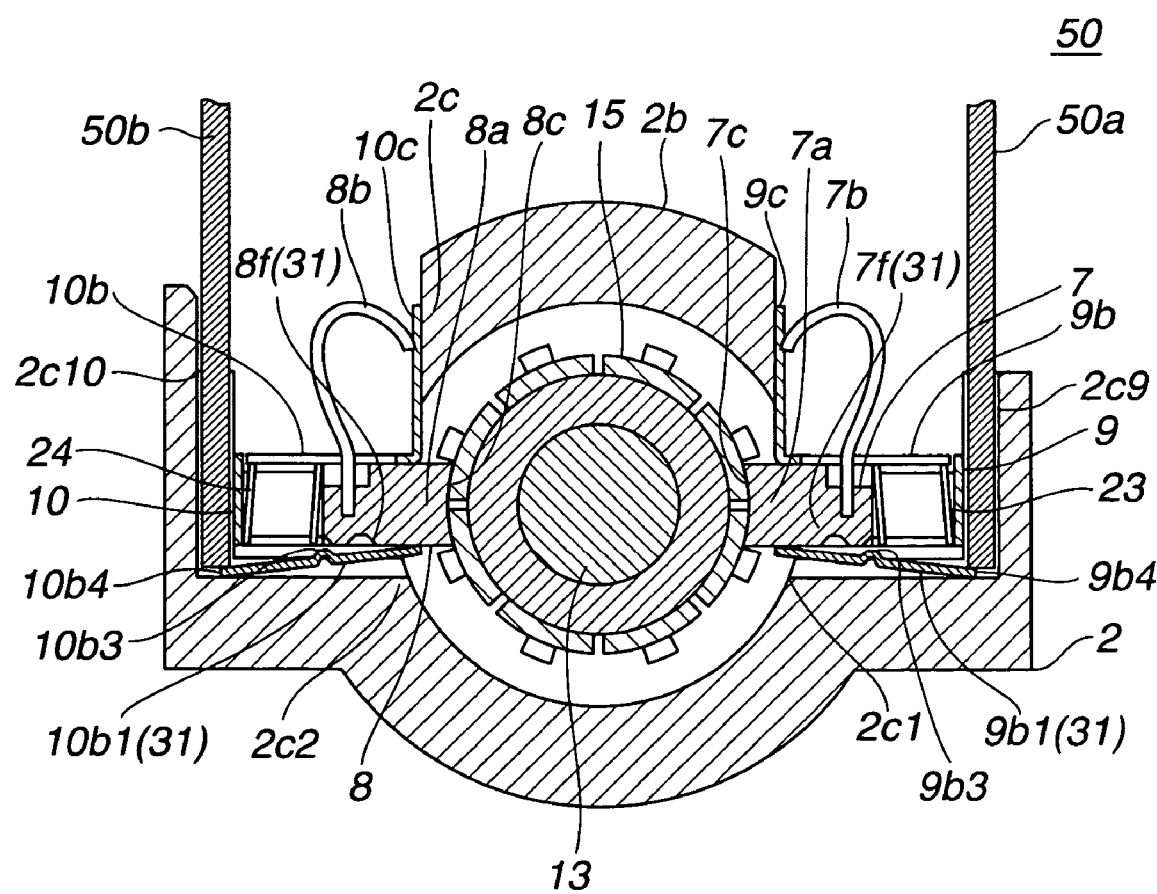
FIG. 8 is a vertical cross section showing positions of the brushes when a commutator is installed in the motor of FIG. 1.
Figure 11:
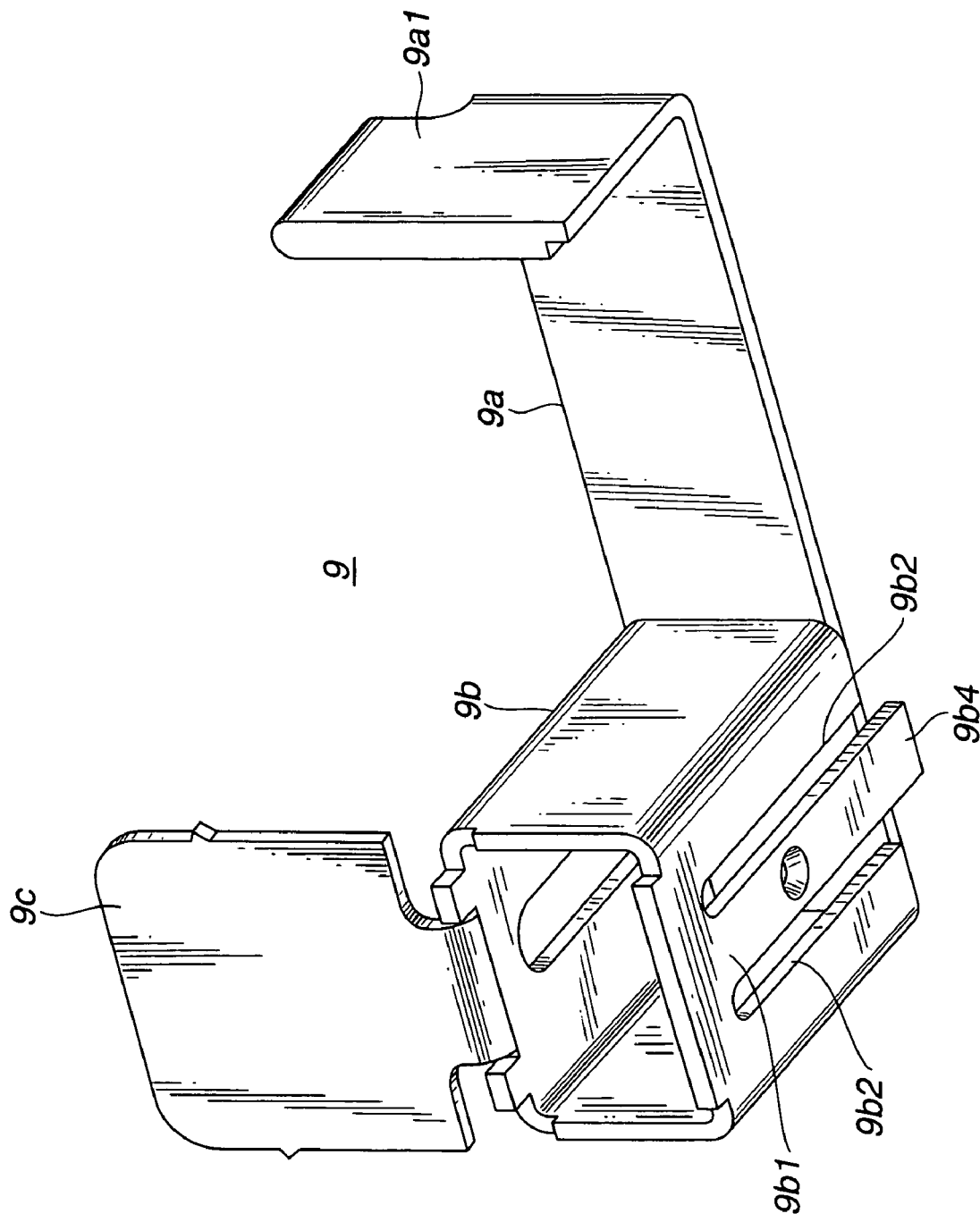
FIG. 11 is an external perspective view of the single first brush holder in the motor of FIG. 1 as seen diagonally from below.
Figure 12:
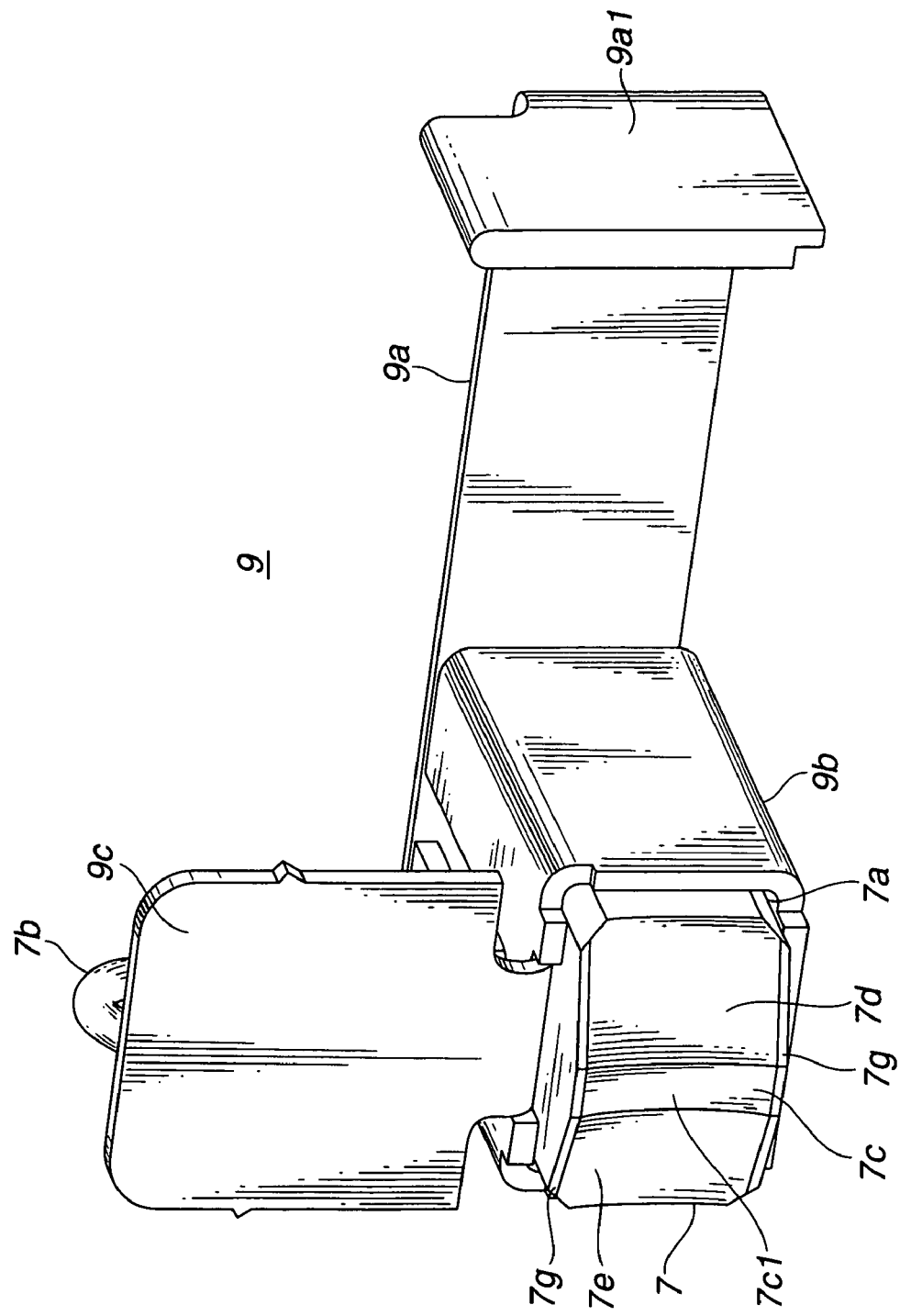
FIG. 12 is an external perspective view, as seen diagonally from above, of the single first brush holder in the motor of FIG. 1 which holds a first brush.
Figure 13:
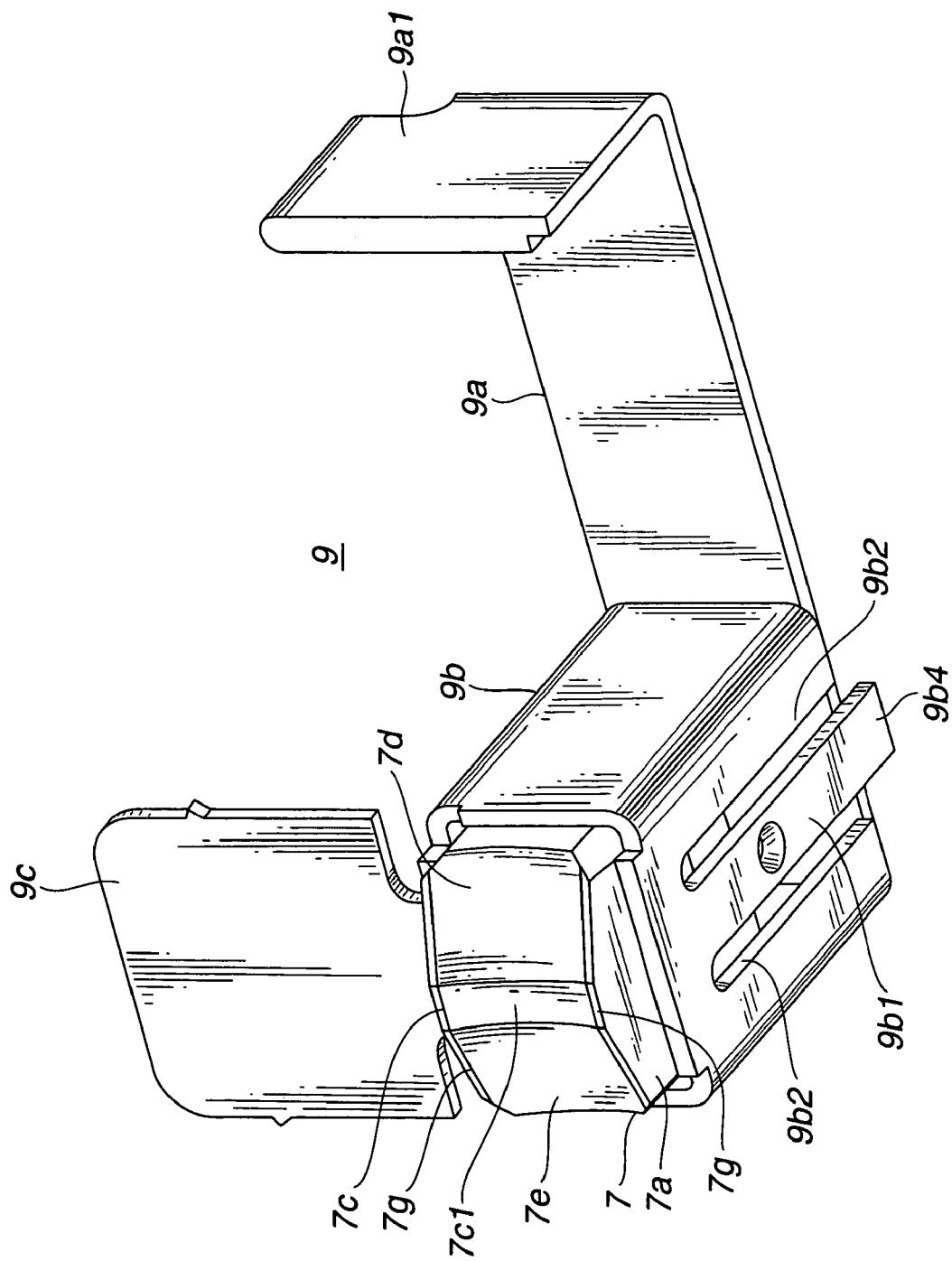
FIG. 13 is an external perspective view, as seen diagonally from below, of the single first brush holder in the motor of FIG. 1 which holds a first brush.
Figure 14:
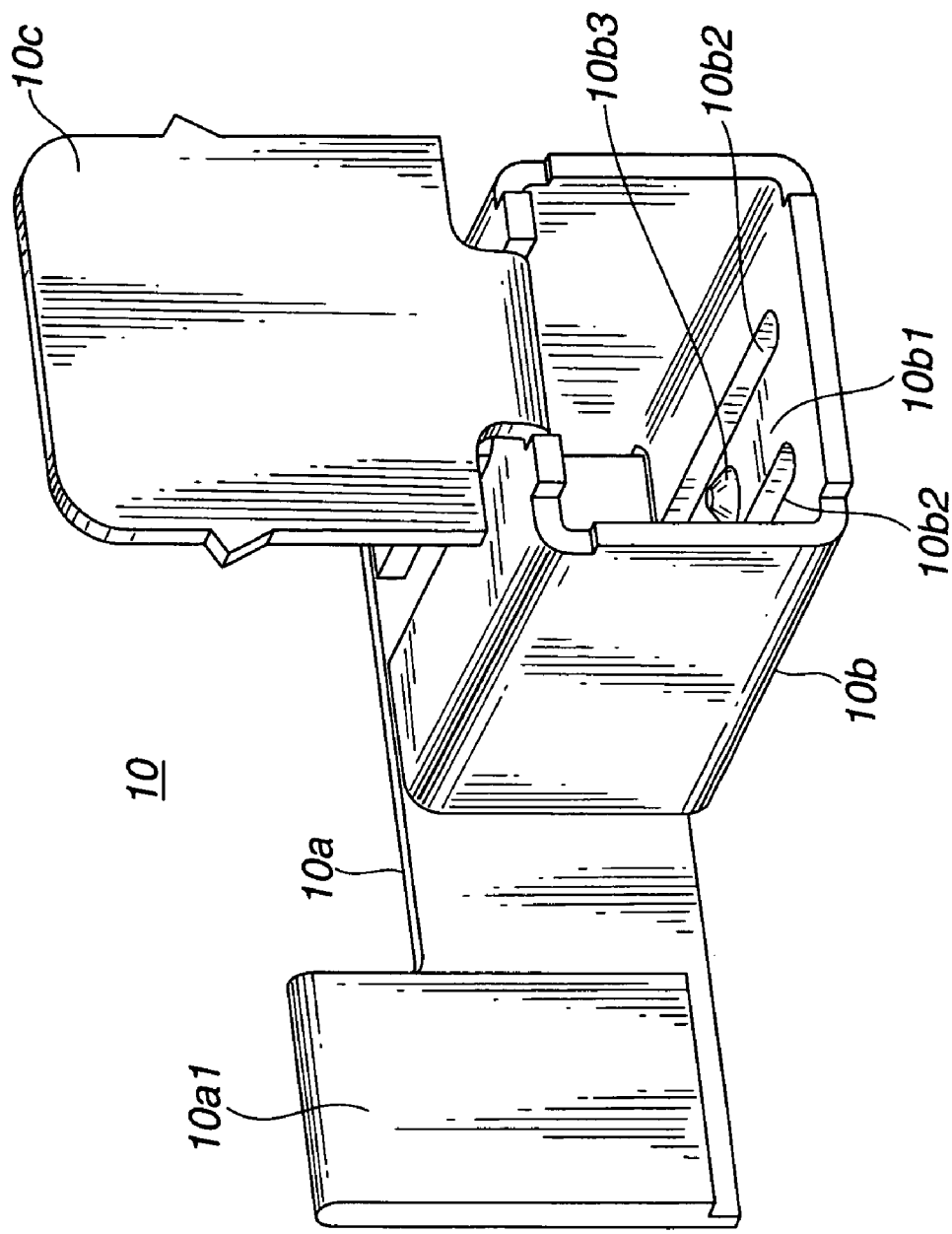
FIG. 14 is an external perspective view of a single second brush holder in the motor of FIG. 1 as seen diagonally from above.
Figure 15:
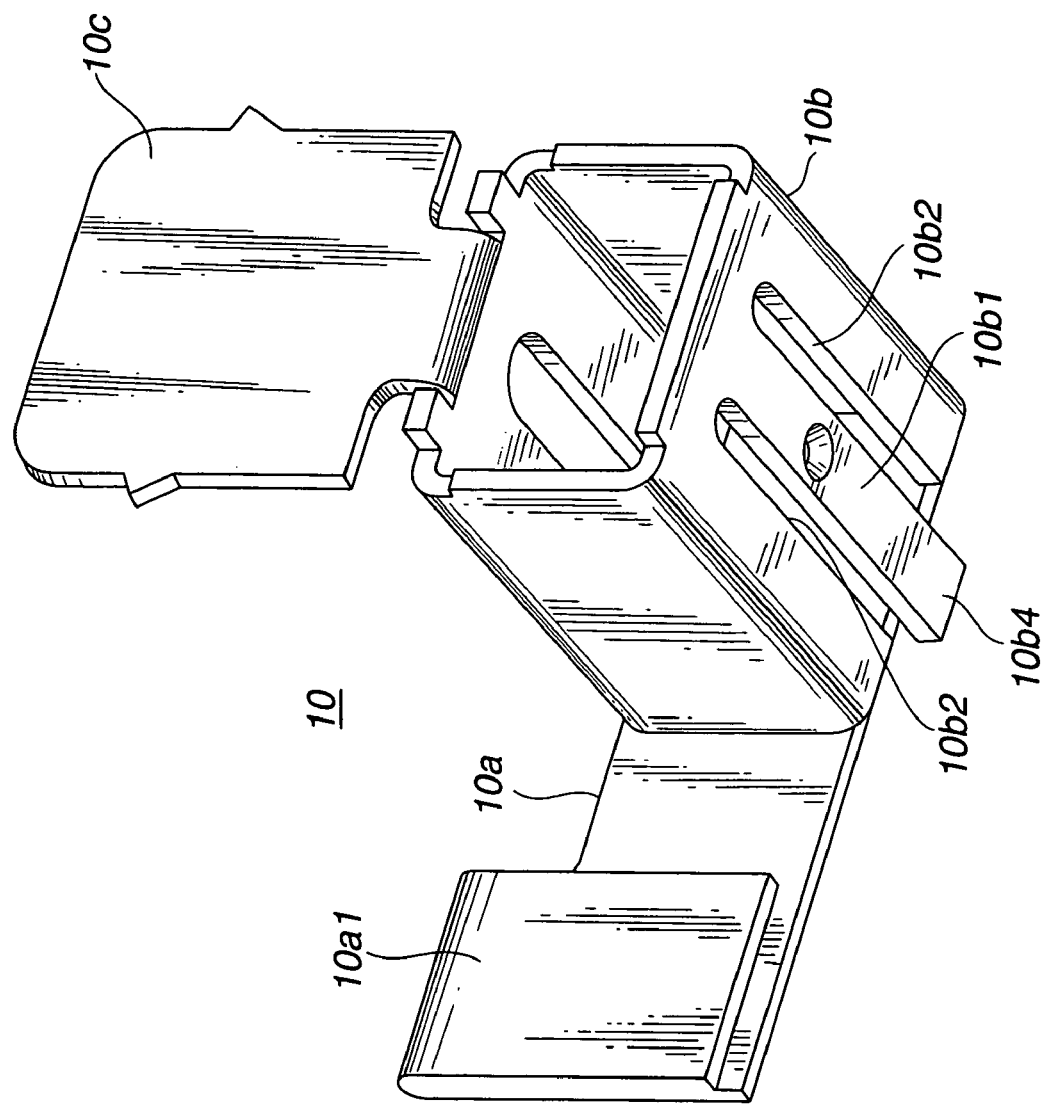
FIG. 15 is an external perspective view of the single second brush holder in the motor of FIG. 1 as seen diagonally from below.
Figure 16:
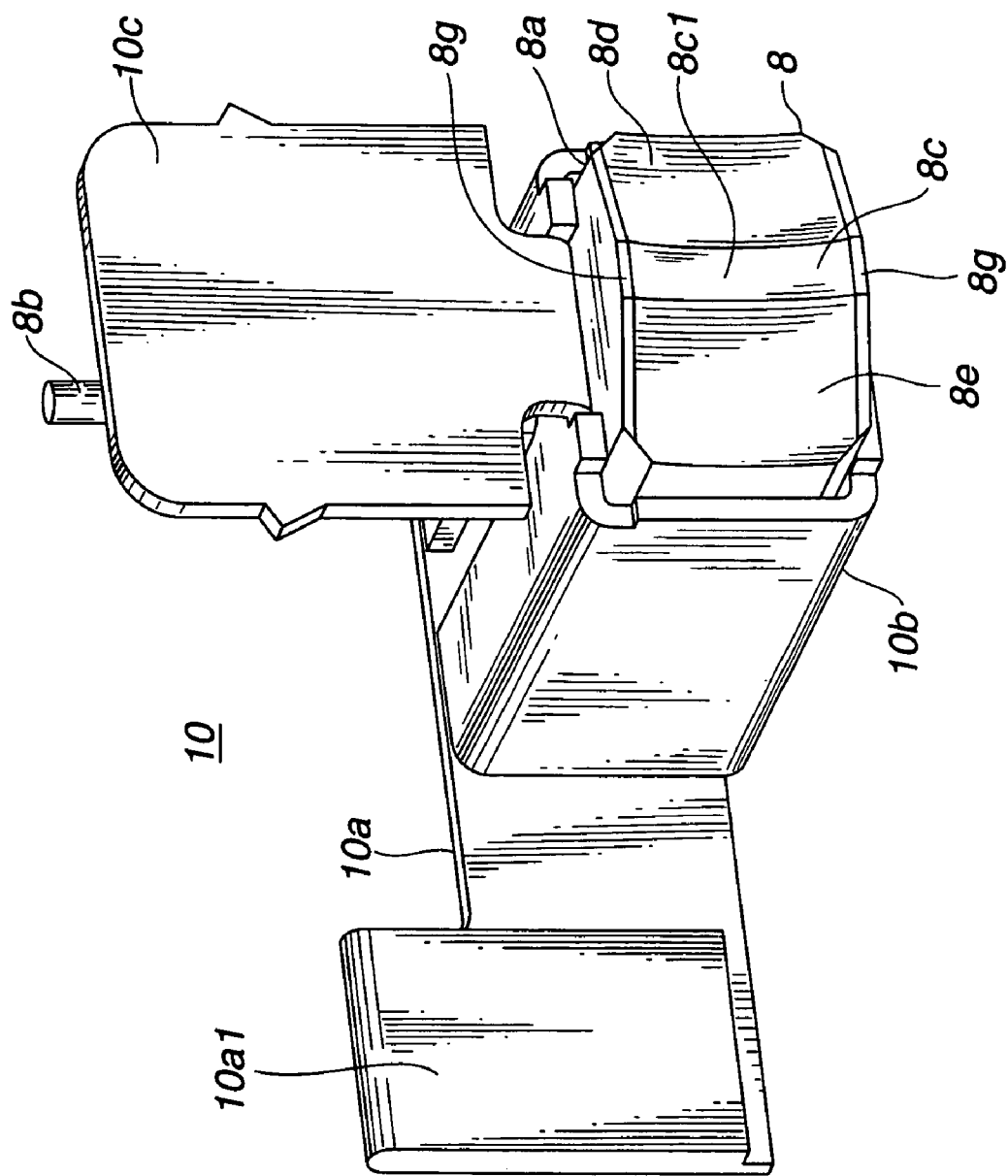
FIG. 16 is an external perspective view, as seen diagonally from above, of the single second brush holder in the motor of FIG. 1 which holds a first brush.
Figure 17:
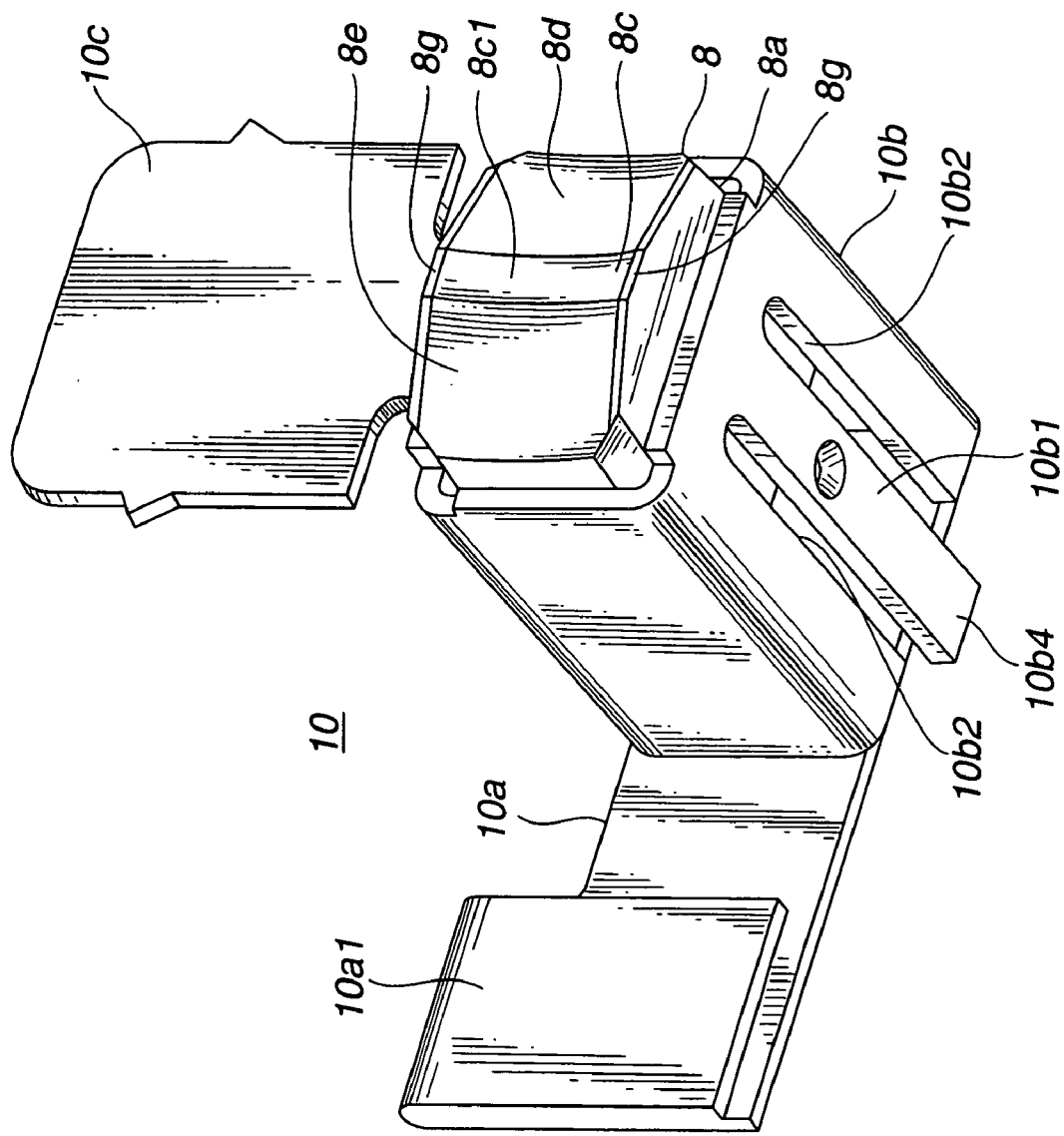
FIG. 17 is an external perspective view, as seen diagonally from below, of the single second brush holder in the motor of FIG. 1 which holds a first brush.

The first and second brush locking tongue pieces 9b1, 10b1 have their free front end portions 9b4, 10b4 arranged elastically deformable inwardly and outwardly of the brush accommodating portions, as shown in FIG. 11 and FIG. 15, with the brush insertion side taken as a base and the opposite side as a front. When the first and second brushes 7, 8 are inserted into the first and second brush accommodating portions 9b, 10b from their inlets, the first and second projections 9b3, 10b3 of the first and second brush locking tongue pieces 9b1, 10b1 fit into locking recesses 7f, 8f formed in the first and second brushes 7, 8, as shown in FIG. 7, thereby keeping the brushes 7, 8 from coming off the brush accommodating portions 9b, 10b. This arrangement temporarily locks the brushes when the commutator 15 is installed between the first and second brushes 7, 8. At this time, a space larger than the external diameter of the commutator 15 is formed between the first and second brushes 7, 8. With the commutator 15 installed in the space between the first and second brushes 7, 8, the protrusions 50a, 50b of the brush unlocking jig 50 are inserted into the first and second protrusion insertion grooves 2c9, 2c10 in the gear case 2. The protrusions 50a, 50b push the front end portions 9b4, 10b4 of the first and second brush locking tongue pieces 9b1, 10b1 to disengage the first and second projections 9b3, 10b3 of the first and second brush locking tongue pieces 9b1, 10b1 from the locking recesses 7f, 8f of the first and second brushes 7, 8. As a result, the first and second brushes 7, 8 are pressed against the commutator 15 for electric connection by elastic recovering forces of the first and second brush springs 23, 24. Since the first and second brushes 7, 8 are pressed against the commutator 15 by the first and second brush springs 23, 24, the locking recesses 7f, 8f of the first and second brushes 7, 8 that were disengaged from the first and second projections 9b3, 10b3 are prevented from being locked again by the first and second projections 9b3, 10b3. Then, the protrusions 50a, 50b of the brush unlocking jig 50 are drawn out from the first and second protrusion insertion grooves 2c9, 2c10 of the gear case 2.

Figure 9:
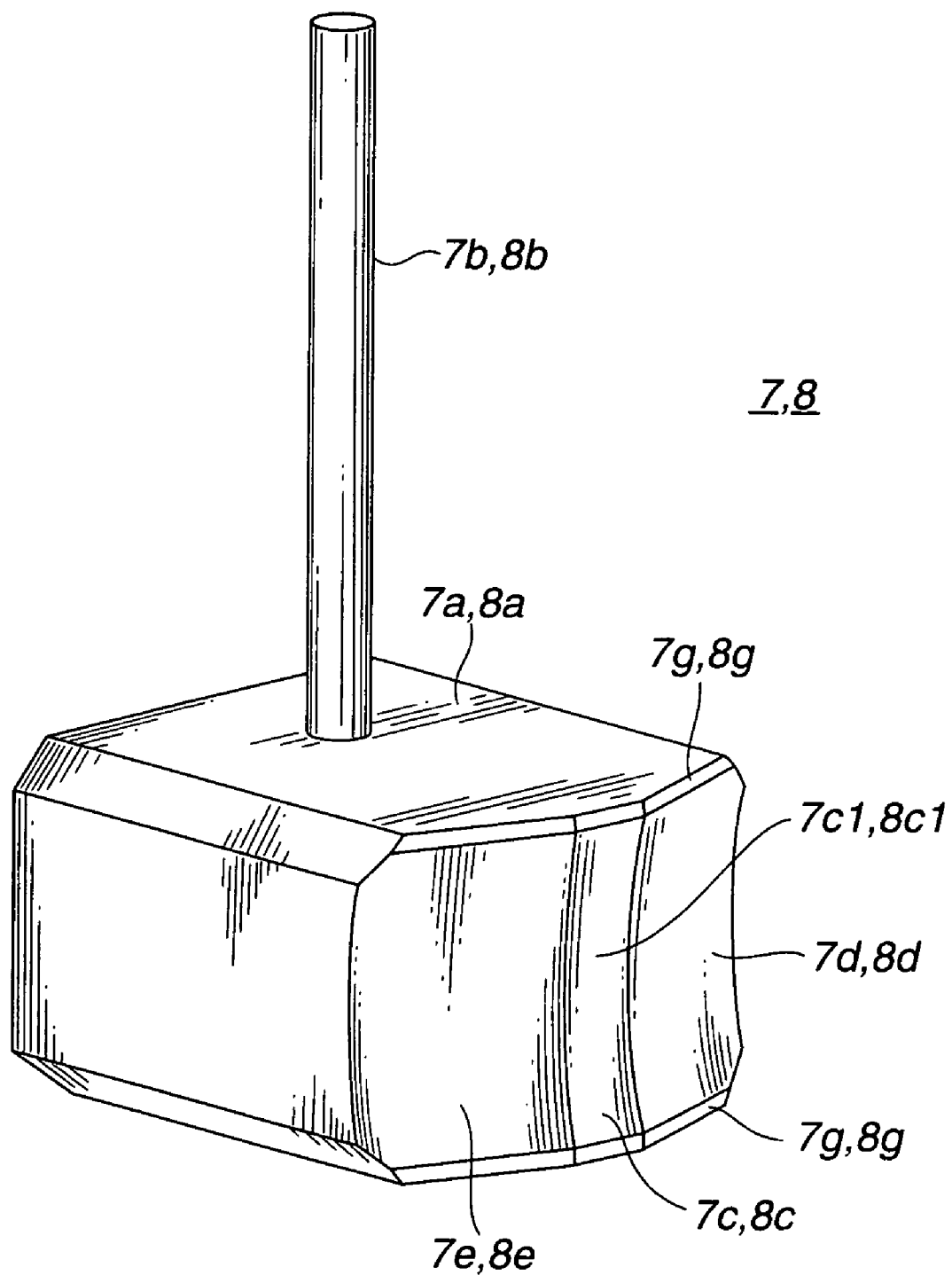
FIG. 9 is an external perspective view of a single brush used in the motor of FIG. 1.
Figure 10:
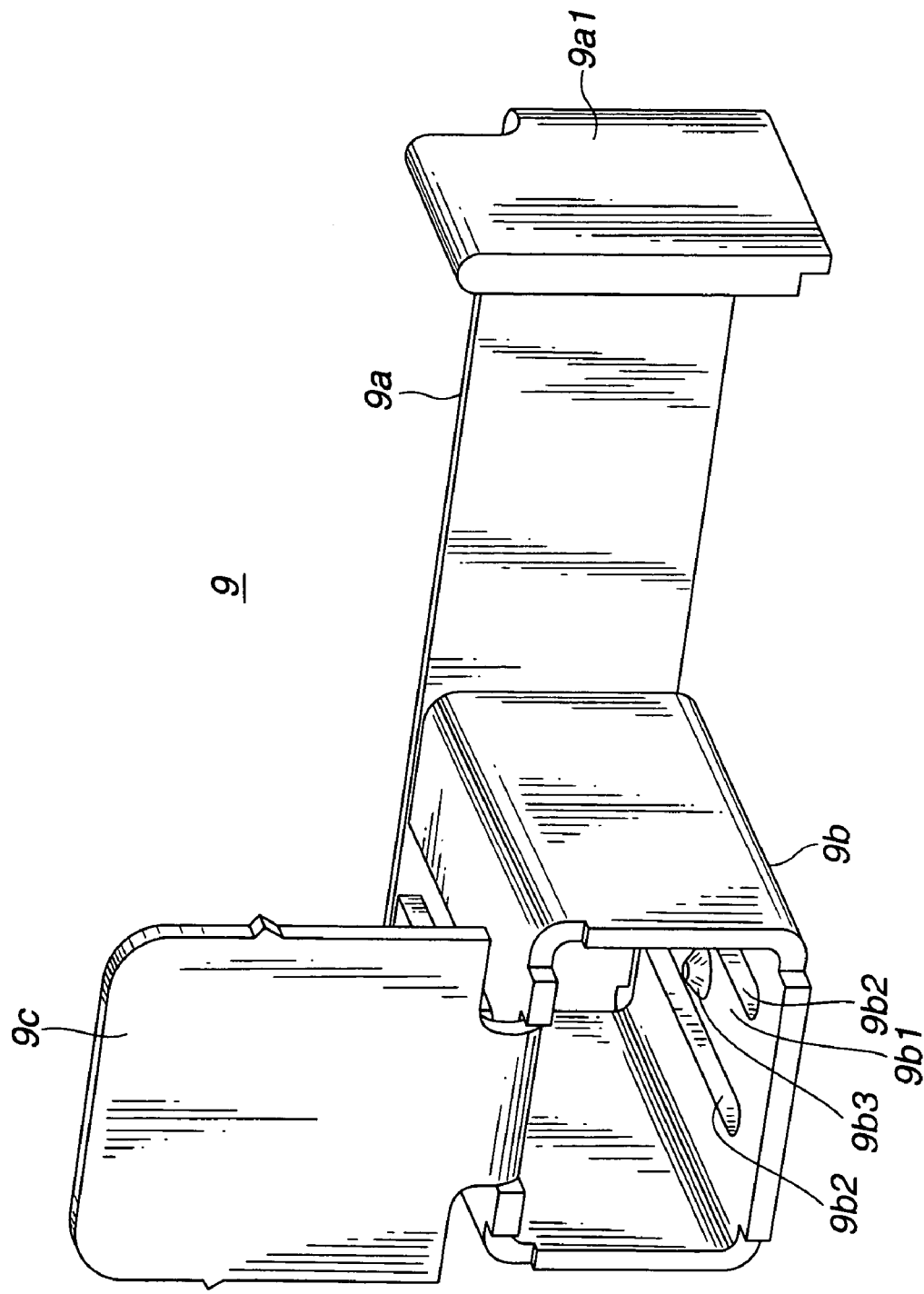
FIG. 10 is an external perspective view of a single first brush holder in the motor of FIG. 1 as seen diagonally from above.

As shown in FIG. 7 and FIG. 9, the first and second brushes 7, 8 have first and second pig tails 7b, 8b electrically connected at one end to the brush bodies 7a, 8a and at the other end to the third and fourth fixing pieces 9c, 10c. The brush bodies 7a, 8a are formed with a pair of first and second tapered surfaces 7d, 7e, 8d, 8e on both sides of slide contact portions 7c, 8c pressed against the commutator 15. The brush bodies 7a, 8a are formed at their bottom surfaces with the locking recesses 7f, 8f that constitute a temporary holding means 31. The slide contact portions 7c, 8c have curved surfaces 7c1, 8c1, respectively, that are curved along the axis of the armature shaft 13. The first and second brushes 7, 8 are in sliding contact with the commutator 15 mainly through the slide contact portions 7c, 8c protruding from the brush bodies 7a, 8a. As the slide contact portions 7c, 8c of the first and second brushes 7, 8 wear, the first and second tapered surfaces 7d, 7e, 8d, 8e also come into contact with the commutator 15, thus increasing the contact surfaces of the first and second brushes 7, 8. The first and second tapered surfaces 7d, 7e, 8d, 8e have a function of progressively increasing the contact area with the commutator 15 as the wear of the first and second brushes 7, 8 proceeds. The slide contact portions 7c, 8c of the first and second brushes 7, 8 are formed at their upper and lower ends with cut portions 7g, 7g, 8g, 8g that also cover the upper and lower ends of the first and second tapered surfaces 7d, 7e, 8d, 8e. The cut portions 7g, 7g, 8g, 8g have a function of eliminating troubles, such as the brushes getting caught by the commutator 15 during sliding contact, that may result if the brushes should tilt in the first and second brush accommodating portions 9b, 10b of the first and second brush holders 9, 10.

The motor 30 and brush device 1 of a construction described above are used as follows. They are mounted on a car body, with the gear case 2 of the motor 30 secured to a roof inner panel of the car, with the output shaft 12 of the wheel gear 11 coupled to the sun roof drive unit, and with the connector of the sun roof control circuit installed in the connector accommodating portion 2e of the gear case 2. When, with a sun roof lid closed, the sun roof control circuit is switched to the lid opening side, the armature shaft 13 and the wheel gear 11 start to rotate in a forward direction, transmitting their force through the output shaft 12 to the sun roof drive unit which then opens the sun roof lid. When, with the sun roof lid open, the sun roof control circuit is switched to the lid closing side, the armature shaft 13 and the wheel gear 11 start to rotate in a reverse direction, transmitting the force through the output shaft 12 to the sun roof drive unit which then closes the sun roof lid.

As described above, the first and second brushes 7, 8 are in sliding contact with the commutator 15 mainly through the slide contact portions 7c, 8c protruding from the brush bodies 7a, 8a. As the slide contact portions 7c, 8c of the first and second brushes 7, 8 wear, the first and second tapered surfaces 7d, 7e, 8d, 8e also come into contact with the commutator 15, gradually increasing the area of the brushes in contact with the commutator 15. Therefore, at first the first and second brushes 7, 8 are in sliding contact with the commutator 15 through a small contact area and, as the wear progresses, the contact area with the commutator 15 progressively increases. Thus, a sharp change in the contact area is prevented. The first and second brush holders 9, 10 for slidably holding the first and second brushes 7, 8 in their first and second brush accommodating portions 9b, 10b are installed in the brush holder mounting portion 2c of the gear case 2 in a direction of the axis of the output shaft 12, so that the first and second fixing pieces 9a, 10a of the first and second brush holders 9, 10 are firmly secured to the gear case 2.

As described above, with the motor and brush device of this invention, since the brush holders for slidably holding the brushes in their brush accommodating portions are installed in the brush holder mounting portion of the gear case in a direction of the axis of the output shaft, the fixing pieces of the brush holders are firmly secured to the gear case. Therefore, the brush holders do not require holder bases and can be mounted directly to the gear case, thus offering the advantage of being able to perform the assembly of the brush holders very easily.

What is claimed is:

1. A brush device comprising:
    a brush electrically connectable to a commutator provided to an armature of a motor; and
    a brush holder secured to a case of the motor to hold the brush in such a way that the brush can be brought into sliding contact with the commutator;
    wherein the brush is formed with a sliding portion and a tapered surface connected at an edge by at least one cut portion, the sliding portion protruding from a brush body to come into sliding contact with the commutator, the tapered surface adjoining the sliding portion and being arranged in a tapered configuration and adapted to contact the commutator and thereby increase an area of the brush in contact with the commutator as the wear of the sliding portion proceeds.

2. A brush device according to claim 1, wherein the tapered surface of the brush comprises first and second tapered surfaces arranged one on each side of the sliding portion formed at almost a center of the brush with respect to a direction of rotation of the commutator.

3. A brush device according to claim 1 or 2, wherein the sliding portion of the brush has a curved surface.

4. A brush device according to claim 1, wherein a pair of the brush and a brush accommodating portion have a temporary locking means which, when inserting the commutator, temporarily locks the brush at a predetermined position so that the commutator can be inserted and which, after the commutator has been inserted, unlocks the brush allowing the brush to come into electrical contact with the commutator.

5. A brush device according to claim 4, wherein the temporary locking means comprises a locking portion formed in the brush and a brush locking tongue piece formed in a part of the brush accommodating portion, the brush locking tongue piece being adapted to engage the locking portion of the brush when the commutator is inserted and, after the commutator has been inserted, to disengage from the locking portion.

6. A brush device according to claim 1, wherein the at least one cut portion is located at an upper edge of the sliding portion and the tapered surface.

7. A brush device according to claim 6, wherein the at least one cut portion is located at upper and lower edges of each of the sliding portion and the tapered surface.

8. A brush device according to claim 1, wherein the at least one cut portion is located at a lower edge of the sliding portion and the tapered surface.

9. A brush device according to claim 1, wherein the at least one cut portion is tapered away from a contact surface of the sliding portion toward the brush body.

10. A geared motor comprising:
    an electric motor having an armature with an armature shaft and a commutator secured to the armature shaft of the armature, the armature being adapted to rotate when energized;
    a rotatable reduction mechanism receiving the rotation of the armature of the motor;
    an output shaft coupled to the reduction mechanism for rotation;
    a gear case connected to the motor rotatably supporting the output shaft;
    first and second brushes electrically connectable to the commutator of the armature of the electric motor;
    a first brush holder having a first fixing portion and a first brush accommodating portion integrally formed therewith, and installed in the gear case and slidably holding the first brush in the first brush accommodating portion;
    a second brush holder having a second fixing portion and a second brush accommodating portion integrally formed therewith, and installed in the gear case and slidably holding the second brush; and
    first and second brush springs for pressing the first and the second brushes against the commutator of the armature;
    wherein the first fixing portion of the first brush holder and the second fixing portion of the second brush holder being directly secured to the gear case independently of each other;
    wherein the gear case is integrally formed with a reduction mechanism accommodating portion for accommodating the reduction mechanism and with first and second brush holder mounting portions in which the first and second brush holders can be installed in a direction of an axis of the output shaft.

11. A motor according to claim 10, wherein the first brush holder has a first terminal portion integrally formed at the free end of the first fixing portion thereof and the second brush holder has a second terminal portion integrally formed at the free end of the second fixing portion thereof.

12. A motor according to claim 10 or 11, wherein the first brush holder has a third fixing portion integrally formed at the upper end of the first brush accommodating portion thereof and the second brush holder has a fourth fixing portion integrally formed at the upper end of the second brush accommodating portion thereof.

* * * * *